§ Patented June 1, 1948

UNITED STATES PATENT OFFICE 2,442,613

PROCESS FOR MAKING POLYSILOXANE ELECTRICAL INSULATING COMPOSITION

Paul O. Nicodemus, York, Pa., assignor to General Electric Company, a corporation of New York No Drawing. Application May 22, 1944, Serial No. 536,833

5 Claims. (Cl. 260—45.5)

The present invention relates to resin-coated copper articles and to improved polysiloxane resin coatings particularly adapted for coating cupreous surfaces. It is particularly concerned with copper conductors provided with insulating coatings comprising polysiloxane resins.

Polysiloxane resins, or more specifically hydrocarbon-substituted polysiloxane resins, known also as silicones, are described for example in Patents 2,258,218 to 2,258,222 issued to Eugene G. Rochow. The present invention is specifically concerned with heat-hardenable polysiloxane resins corresponding to the general formula

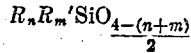

wherein R and R' represent the same or different hydrocarbon or halogenated hydrocarbon radicals, and $n$ and $m$ are numbers the sum of which is greater than about 1 and less than 2. Such resins can be prepared for example by hydrolysis and dehydration of mixtures of suitable organosilicon halides or mixtures thereof with a silicon tetrahalide. Resins of the latter type are specifically described and claimed in the copending application of Eugene G. Rochow, S. N. 393,843, filed May 16, 1941, and assigned to the same assignee as the present invention. As the polysiloxane resins are particularly characterized by very good heat-resistance, it has been proposed that they be employed as protective and insulating coatings for metal bases, including cupreous articles which may be subjected to elevated temperatures. However, it has been found that in the case of copper articles coated with polysiloxane resins or wrapped with polysiloxane-impregnated tapes or the like, the limiting temperature at which such articles can be used is determined, not by the temperature the polysiloxane resin will stand, but by the temperature at which oxidation of the copper base occurs. This limiting temperature has been found to be between 175 degrees and 200 degrees C. At 200 degrees C., the degree of oxidation of the copper is so great as to render impractical the use of polysiloxane-covered copper bodies at this temperature.

The present invention is based on my discovery that by treating the polysiloxane resins with a small amount of boric acid, the corrosion of copper articles coated with compositions comprising the treated polysiloxanes is materially reduced or completely prevented at elevated temperatures. The boric acid may be introduced into the polysiloxane solution in various ways. For example a solution of the heat-hardenable polysiloxane in an aromatic hydrocarbon solvent such as toluene can be refluxed with an excess of boric acid for a short time to saturate the solution with the acid. Alternatively small amounts of a soluble organic borate such as tri-ethyl borate or equivalent easily-hydrolyzable reaction product of a lower aliphatic alcohol and boric acid can be added to the solution of the polysiloxane. Such borates readily hydrolyze in the presence of small amounts of moisture to liberate boric acid. An amount of tri-ethyl borate or similar borate equivalent to 5 per cent boric acid based on the weight of the polysiloxane will effectively inhibit the oxidation of copper up to a temperature of 200 degrees C.

Coating compositions which are particularly adapted for insulating purposes comprise solutions of methyl phenyl polysiloxane resins and acrylic resins, particularly the methacrylic resins, which have been treated with boric acid. Polysiloxane resins in themselves require a prolonged bake at high temperatures to set the resins resulting in a material reduction of the useful life of the cured resins in so far as flexibility, strength, and craze-resistance is concerned. I have found that the acrylic resins which are compatible with the methyl phenyl silicones over a wide range of proportions materially improve the curing properties of the methyl phenyl resins. Films prepared from coating compositions comprising from 15 to 35 per cent by weight of methyl methacrylate resin based on the weight of the methyl phenyl polysiloxane resin are hard and flexible and have been found to set on evaporation of the solvent. Sheet insulating materials impregnated with such mixtures exhibit better flexibility and tear strength than do similar materials impregnated with the unmodified methyl phenyl resins. The heat and electrical properties of the modified polysiloxane compositions are comparable with the methyl phenyl polysiloxane resins. As the borate esters tend to throw the methacrylate resins out of solution, compositions containing these preferably are treated with boric acid by the reflux method.

To illustrate the effectiveness of the boric acid treatment, toluene solutions of methyl, methyl phenyl and ethyl phenyl polysiloxane resins and methyl phenyl polysiloxane-methyl methacrylate resin mixtures were prepared. A portion of each of the solutions was refluxed with an excess of boric acid for a half-hour period and thereafter decanted from the excess acid. Copper strips were coated with the treated and untreated resins and then baked for two minutes at 395° C. Felted asbestos tapes were impregnated with the treated and untreated silicone-methacrylate mixtures. The surface of the tape coated with the treated resin was dusted with boric acid. These tapes were wrapped on polished copper strips using as an adhesive the silicone-methacrylate resin mixture employed for coating or impregnating the tapes. All of the samples were then heated at 200 deg. C. for a period of 500 hours in a convection type oven and the degree of oxidation of the coated copper strips noted at various intervals throughout the bake. The results showed that the treatment of the various polysiloxane resins materially reduced or eliminated the oxidation of the copper base at this temperature. Best results were obtained with the treated methyl phenyl polysiloxane resins and the tape impregnated with the methyl phenyl polysiloxane-methacrylate mixture and dusted with boric acid. In no case did any appreciable difference in dielectric strength result from the boric acid treatment.

Straight polysiloxane resins to which have been added tri-ethyl borate in amounts equivalent to up to 5 per cent boric acid are in general even better than the same resins saturated with boric acid in so far as the oxidation of copper surfaces coated therewith is concerned.

As has been stated previously, the boric acid treated resins are particularly adapted for the insulation of copper conductors. They may be applied in film form by passing the conductor through a solution of the resin and thereafter evaporating the solvent and completing the cure or set of the resin. They also may be used as impregnants for insulation such as asbestos or glass (the impregnant being applied after application of the asbestos or glass insulation) or as impregnants for sheet insulation such as glass or asbestos which are applied to the conductor in impregnated tape form. The boric acid treatment of the polysiloxane is desirable whether the insulation is superimposed directly on the conductor or is applied adjacent the conductor with a layer or layers of other insulation such as cellulose acetate tape in direct contact with the conductor. The methacrylate-modified coating and impregnating materials are particularly suited to the latter type of structure due to their lower curing temperatures. An insulated conductor of this type which is particularly adapted for use as a lead wire for electric heating units, etc., comprises a copper conductor, a thin layer of cellulose acetate tape applied directly to the conductor followed by a thin wall of felted asbestos impregnated with a mixture of 80 parts methyl phenyl polysiloxane resin and 20 parts of polymeric methyl methacrylate which has been treated in toluene solution with boric acid. The toluene solution contained a total resin solids content of 30 per cent. A glass braid is applied over one or more of the impregnated asbestos coated conductors and is finished by impregnation with a methyl phenyl polysiloxane-methyl methacrylate composition.

While the present invention has been described with reference to certain specific polysiloxane resins it is to be understood that it is not restricted thereto. Hydrocarbon-substituted polysiloxane resins with which the present invention is concerned include any of the heat-hardenable resins obtained by hydrolysis of alkyl, aralkyl, aryl, and alkaryl or mixed alkyl-aryl, etc., silicon halides or esters, mixtures of two or more such silicon compounds or mixtures thereof with a silicon tetrahalide or ester provided the resultant resinous material contains an average of more than 1 and less than 2 hydrocarbon groups attached to silicon atoms. Examples of organic borates other than tri-ethyl borate which may be employed are the butyl and propyl borates.

What I claim as new and desire to secure by Letters Patent of the United States, is:

1. The process for making an electrical insulating composition suitable for insulating a copper core, the said process comprising (1) forming a solution in an aromatic hydrocarbon solvent of a mixture of ingredients comprising (a) a methyl phenyl polysiloxane resin wherein the average ratio of the sum of the total methyl and phenyl groups attached to each silicon atom is from 1 to less than 2, and (b) from 15 to 35 per cent, by weight, based on the weight of the methyl phenyl polysiloxane, of polymeric methyl methacrylate, (2) adding to the said solution, as an oxidation inhibitor for the copper, an amount of boric acid in excess of that required to saturate the solution with the said acid, and (3) refluxing the mixture of the hydrocarbon solution with the boric acid to dissolve boric acid.

2. The process for making an electrical insulating composition suitable for insulating a copper core, the said process comprising (1) forming a solution in toluene of a mixture of ingredients comprising (a) a methyl phenyl polysiloxane resin wherein the average ratio of the sum of the total methyl and phenyl groups attached to each silicon atom is from 1 to less than 2, and (b) from 15 to 35 per cent, by weight, based on the weight of the methyl phenyl polysiloxane, of polymeric methyl methacryate, (2) adding to the said solution, as an oxidation inhibitor for the copper, an amount of boric acid in excess of that required to saturate the solution with the said acid, and (3) refluxing the mixture of the hydrocarbon solution with the boric acid to dissolve boric acid.

3. The process for making an electrical insulating composition suitable for insulating a copper core, the said process comprising (1) forming a solution in an aromatic hydrocarbon solvent of a mixture of ingredients comprising (a) a methyl phenyl polysiloxane resin wherein the average ratio of the sum of the total methyl and phenyl groups attached to each silicon atom is from 1 to less than 2, and (b) from 15 to 35 per cent, by weight, based on the weight of the methyl phenyl polysiloxane, of polymeric methyl methacrylate, (2) adding to the said solution, as an oxidation inhibitor for the copper, an amount of boric acid in excess of that required to saturate the solution with the said acid, (3) refluxing the mixture of the hydrocarbon solution with the boric acid to dissolve boric acid, and (4) decanting the formed solution from the excess boric acid.

4. The process for making an electrical insulating composition suitable for insulating a copper core, the said process comprising (1) forming a solution in toluene of a mixture of ingredients comprising (a) a methyl phenyl polysiloxane resin wherein the average ratio of the sum of the total methyl and phenyl groups attached to each silicon atom is from 1 to less than 2, and (b) from 15 to 35 per cent, by weight, based on the weight of the methyl phenyl polysiloxane, of polymeric methyl methacrylate, (2) adding to the said solution, as an oxidation inhibitor for the copper, an amount of boric acid in excess of that required to saturate the solution with the said acid, (3) refluxing the mixture of the hydrocarbon solution with the boric acid to dissolve boric acid, and (4) decanting the formed solution from the excess boric acid.

5. The process for making an electrical insulating composition suitable for insulating a copper core, which process comprises (1) forming a mixture of (a) a methyl phenyl polysiloxane resin having an average ratio of from 1 to less than 2 total methyl and phenyl groups attached to each silicon atom, (b) polymeric methyl methacrylate in an amount equal to from 15 to 35 per cent, by weight, of the methyl phenyl polysiloxane, (c) an aromatic hydrocarbon solvent for (a) and (b), and (d) an oxidation inhibitor for the copper consisting of boric acid in excess of that required to saturate the solution with the said acid, and (2) refluxing the mixture of (1) to dissolve boric acid.

PAUL O. NICODEMUS.

REFERENCES CITED

The following references are of record in the file of this patent:

UNITED STATES PATENTS

| Number    | Name     | Date          |
|-----------|----------|---------------|
| 2,022,827 | Ruben    | Dec. 3, 1935  |
| 2,084,261 | Boughton | June 15, 1937 |
| 2,258,222 | Rochow   | Oct. 7, 1941  |
| 2,371,068 | Rochow   | Mar. 6, 1945  |
| 2,375,998 | McGregor | May 15, 1945  |

FOREIGN PATENTS

| Number  | Country       | Date          |
|---------|---------------|---------------|
| 548,911 | Great Britain | Oct. 29, 1942 |
| 549,081 | Great Britain | Nov. 5, 1942  |